United States Patent
Anderson et al.

(10) Patent No.: US 7,099,522 B2
(45) Date of Patent: Aug. 29, 2006

(54) METHOD TO CREATE AND RECONSTRUCT IMAGE PRESENTATION SYSTEM

(75) Inventors: Brad Anderson, Boise, ID (US);
Leonard Schroath, Boise, ID (US);
William Herrmann, Eagle, ID (US);
Bruce Johnson, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 685 days.

(21) Appl. No.: 10/159,873

(22) Filed: May 30, 2002

(65) Prior Publication Data
US 2003/0231800 A1 Dec. 18, 2003

(51) Int. Cl.
*G06K 9/36* (2006.01)

(52) U.S. Cl. .................................. 382/287

(58) Field of Classification Search ........... 382/287
See application file for complete search history.

(56) References Cited

U.S. PATENT DOCUMENTS

| | | | | |
|---|---|---|---|---|
| 5,661,506 A | * | 8/1997 | Lazzouni et al. | 345/179 |
| 6,097,497 A | * | 8/2000 | McGraw | 358/1.12 |
| 6,330,976 B1 | * | 12/2001 | Dymetman et al. | 235/487 |
| 2002/0048030 A1 | * | 4/2002 | Soscia | 358/1.9 |

FOREIGN PATENT DOCUMENTS

| | | |
|---|---|---|
| EP | 1333402 A1 | 8/2003 |
| WO | WO00/57351 A1 | 9/2000 |
| WO | WO00/73981 | 12/2000 |
| WO | WO01/75779 | 10/2001 |
| WO | WO03/038741 | 5/2003 |

OTHER PUBLICATIONS

Anderson et al., United States Patent Application entitled "Image Preservation and Reconstruction," U.S. Appl. No. 10/158,287, filed May 30, 2002 (Related Application).

United Kingdom Search Report dated Oct. 17, 2003, United Kingdom Patent Application GB0311702.5 issued by the Patent Office in the United Kingdom.

* cited by examiner

*Primary Examiner*—Wenpeng Chen
*Assistant Examiner*—Sath V. Perungavoor (57) ABSTRACT

A method of embedding a printable medium is provided, and includes embedding the printable medium with one or more position codes. A method of reconstructing an image presentation system also is disclosed, and includes scanning portions of the image presentation system and orientating the portions according to one or more position codes embedded on the printable medium of the image presentation system.

15 Claims, 5 Drawing Sheets

FIG. 1

X → x position

Y → y position

N → Page Identifier

METHOD TO CREATE AND RECONSTRUCT IMAGE PRESENTATION SYSTEM

CROSS REFERENCE TO RELATED APPLICATIONS

This application is related to co-pending U.S. patent application entitled "Image Preservation and Reconstruction" filed on even date herewith and accorded Ser. No. 10/158,287.

TECHNICAL FIELD

The present invention is generally related to the field of image presentation and, more particularly, is related to an image presentation system and a method for creating and/or reconstructing an image presentation system.

BACKGROUND OF THE INVENTION

A document is usually shredded to render it unreadable and/or to prevent the document from being easily reassembled into its original form. Methods used to destruct documents include, for example, standard strip shredding or crosscut shredding, in which case the document is usually cut or torn into fine strips. There may be times when it is desirable to maintain the permanence of certain official documents, such as stock certificates or historical documents. In such case, should the document be accidentally or unintentionally shredded, or otherwise destructed, it would be desirable to recreate the document into its pristine condition.

Heretofore, reconstructing a shredded document can involve extremely tedious measures. One approach has been to align shredded portions one by one next to each other and determine whether images on the shredded portions match up. Once two portions are found to match up, additional portions may be added until the document is completed. For a one page document, such method may prove satisfactory, but for larger documents in which there have been generated a multitude of strips the task of reassembling the document, shredded portion by shredded portion, becomes impractical.

Moreover, once the proper positions of the shredded portions have been determined, the shredded portions must be fixed into those positions in order to recreate a document which resembles its original. This has been accomplished, for example, by attaching the shredded portions together with an adhesive tape or the like and running a photocopy of same. Alternatively, or additionally, the reassembly of the shredded portions has been scanned in by a scanner and an image generated by a computer. In either case, the reassembling of the shredded portions in the first place usually results in a degradation of the print quality from that of the original document. Of course, optical character recognition (OCR) may be used to recreate textual portions of a document, but OCR is unsatisfactory for documents containing non-textual images and still does not avoid the inconvenience of having to piecemeal reassemble the shredded portions of the document.

SUMMARY OF THE INVENTION

In view of the foregoing, the present invention provides a method of encoding a printable medium, comprising embedding at least one position code on the printable medium. The position code(s) includes machine-readable data indicative of the position of the position code on the printable medium relative to the printable medium.

According to another aspect of the invention, there is provided a system for encoding a printable medium, comprising a printer, and means for controlling the printer to embed at least one position code on the printable medium. The at least one position code includes machine-readable data indicative of the position of the position code on the printable medium relative to the printable medium.

According to another aspect of the invention, there is provided a program stored on a computer readable medium for encoding a printable medium, comprising code that embeds at least one position code on the printable medium. The position code(s) includes machine-readable data indicative of the position of the position code on the printable medium relative to the printable medium.

According to another aspect of the invention, there is provided a method of reconstructing portions of an image presentation system. The image presentation system includes a printable medium and one or more position codes embedded thereon. Each position code is indicative of a position of the position code on the printable medium relative to the printable medium. The method comprises scanning portions of the image presentation system, examining the portions of the image presentation system, identifying one or more of the position codes on the printable medium of the image presentation system, and orientating the portions according to the position indicated by the one or more position codes.

According to another aspect of the invention, there is provided a system for reconstructing portions of an image presentation system, the image presentation system including a printable medium and one or more position codes embedded thereon, each position code being indicative of a position of the position code on the printable medium relative to the printable medium. The system comprises means for scanning portions of the image presentation system, means for examining the portions of the image presentation system, means for identifying one or more of the position codes on the printable medium of the image presentation system, and means for orientating the portions according to the position indicated by the one or more position codes.

According to another aspect of the invention, there is provided a program stored on a computer readable medium for reconstructing portions of an image presentation system. The image presentation system includes a printable medium and one or more position codes embedded thereon. Each position code is indicative of a position of the position code on the printable medium relative to the printable medium. The program comprises code that scans portions of the image presentation system, code that examines the portions of the image presentation system, code that identifies one or more of the position codes on the printable medium of the image presentation system, and code that orientates the portions according to the position indicated by the one or more position codes.

BRIEF DESCRIPTION OF THE DRAWINGS

The invention can be understood with reference to the following drawings. The components in the drawings are not necessarily to scale. Also, in the drawings, like reference numerals designate corresponding parts throughout the several views.

DETAILED DESCRIPTION OF THE INVENTION

Figure 1:
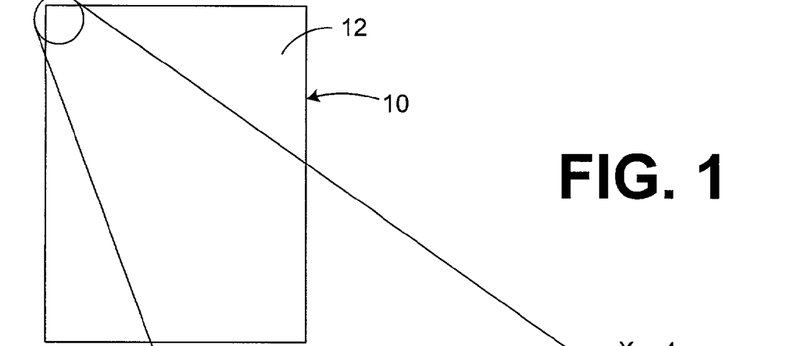
FIG. 1 illustrates an image presentation system in accordance with an embodiment of the present invention, with an upper left portion thereof enlarged to show position codes.
Figure 2:
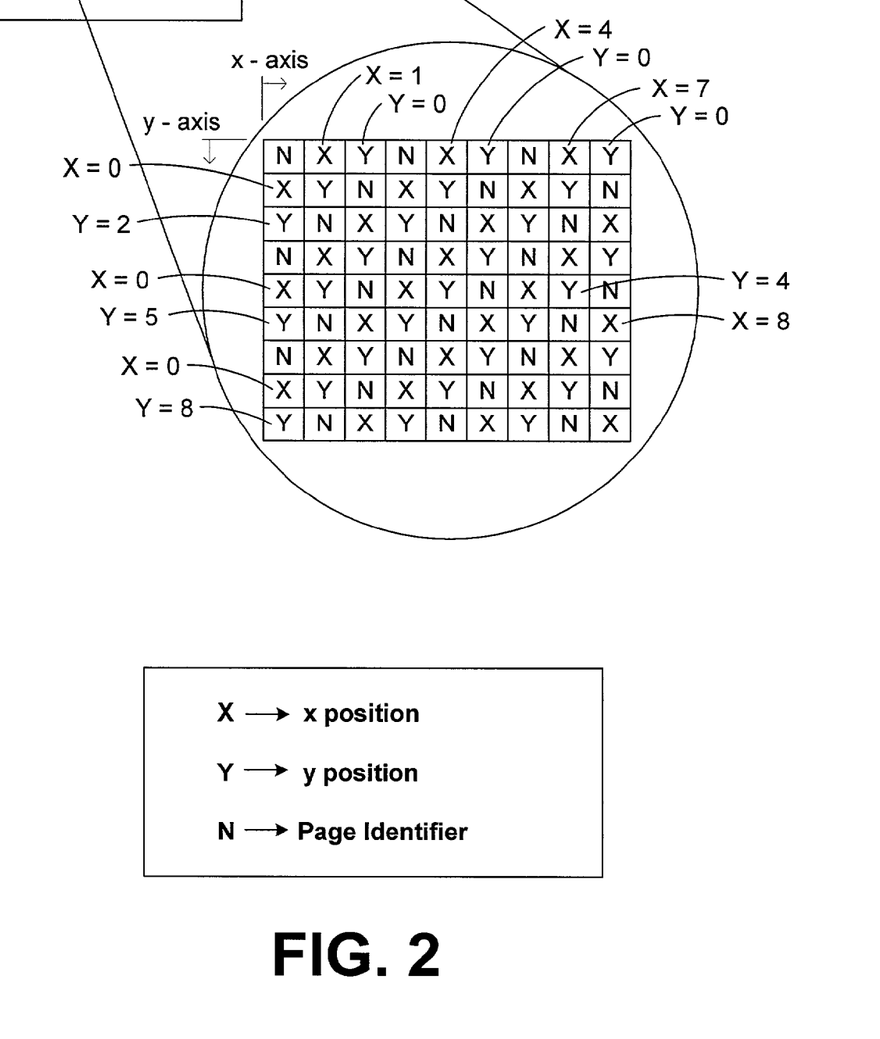
FIG. 2 illustrates exemplary position code data of the exemplary position codes shown in FIG. 1.

Referring now to the drawings in detail and initially to FIGS. 1 and 2, a system for image presentation 10 in accordance with an embodiment of the present invention is shown. The document 10 includes one or more printable mediums 12. The printable mediums may be, for example, a page of paper or other media upon which an image or text may be written, printed, or otherwise disposed thereon. A plurality of machine-readable position codes or identifiers X, Y and N are embedded on the printable medium 12. In this respect, the term "machine-readable" means data that can be read and interpreted or recognized by a machine. In this respect, the machine-readable data may be, for example, scannable data or other data. The position codes X, Y and N comprise machine-readable data which indicate a position of the respective position codes X, Y and N on the printable medium 12 relative to the printable medium 12. When the original printable medium 12 is shredded into multiple strips of media, the position codes X, Y and N may be used to reconstruct the original printable medium 12 including any images or text thereon. To this end, a suitable scanning device may be used to scan the shredded strips of the printable medium 12 which, in turn, can be processed, for example via a processor circuit or computer, to determine the positions of the position codes X, Y and N relative to the printable medium 12, and more generally the positions of the strips of the printable medium 12 on which the position codes X, Y and N reside relative to the remainder of the printable medium 12, in order to reconstruct the printable medium 12.

The printable medium 12 of FIG. 1 includes machine-readable position codes X, Y and N. The position codes X, Y and N may be embedded on the printable medium 12 via any suitable method, for example, via halftoning algorithms and/or pixel placement, as is further described below. "Embedded on" as used herein means any suitable means for presenting the codes on or in the printable medium 12. For example, the codes may be disposed on, fused in, engraved in, printed on, stamped in, pressed in, sprayed on, deposited on, or marked on the printable medium 12. Other techniques may be available for presenting the position codes on or in the printable medium 12, and such techniques are contemplated as falling within the scope of the present invention. Also, there may be portions of the printable medium 12 for which it is not desired to incorporate a reconstructable feature, in which case such portions need not have position codes embedded thereon.

In the illustrated embodiment, the position codes X, Y and N are embedded in sequence on the printable medium 12 along mutually perpendicular axes x and y so as to form a grid. FIG. 2 is an explanatory caption of the position codes X, Y and N of the FIG. 1 illustration. The position code X represents an x position of the position code X relative to the printable medium 12 on which the position code X is embedded. The position code Y represents a y position of the position code Y relative to the printable medium 12 on which the position code Y is embedded. The position code N represents a page identifier which, in the illustrated embodiment, may include a serial number of an imaging engine used to embed the position codes X, Y or N on the printable medium 12, and the most recent page number (that is, the total page count) produced by the imaging engine. For example, if the imaging engine serial number is 1234500 and the page counter of the imaging engine is at 98765, the position code N may be 123450098765. In this way, the position code N provides a unique identifier for each page. As is further described below, the position codes X, Y and N function as "printable medium specific position codes," as they comprise machine-readable data indicative of where the position codes X, Y and N reside relative to the printable medium 12 and consequently where that portion or surface area of the printable medium 12 on which the position codes X, Y and N reside is located relative to the remainder of the printable medium 12.

A shredded portion of the printable medium 12 that includes a sequence or grid of the machine-readable position codes X, Y and N will provide the x position, y position, and page identifier of that shredded portion relative to the printable medium 12 as a whole. Thus, for example, for a shredded portion of the printable medium 12 that includes the first row (where a row is defined from left to right in FIG. 1) of position codes NXYNXYNXY of the enlarged portion shown in FIG. 1, the values of the position codes X increase by three (3) along the shredded portion (for example, X=1, 4, 7), and the values of the position codes Y remain the same (that is, Y=0, 0, 0). The position code N also remains the same (for example, N=123450098765). Accordingly, the shredded portion would indicate, upon the position codes X, Y and N thereon being scanned and processed, that the shredded portion contains position codes X, Y and N from a horizontal strip in the first row (that is, y=0) of page 98765 of imaging engine 1234500 (that is, N=123450098765), with the position codes X positioned at their respective 1, 4 and 7 positions along the x-axis of the grid forming page 98765.

In a similar manner, for a shredded portion of the printable medium 12 that includes the first column (where a column is defined as from top to bottom in FIG. 1) of position codes NXYNXYNXY, the values of the position codes X and N remain the same (that is, X=0, 0, 0, and N=123450098765), while the position codes Y increase by three (3) along the shredded portion (for example, Y=2, 5, 8). Here, the shredded portion would indicate, upon the position codes X, Y and N thereon being scanned and processed, that the shredded portion contains position codes X, Y and N from a vertical strip in the first column (that is, x=0) of page 98765 of imaging engine 1234500 (that is, N=123450098765), with the position codes Y positioned at their respective 2, 5 and 8 positions along the y-axis of the grid forming page 98765.

It will be appreciated that the sequential arrangement of the position codes X, Y and N along the x and y axes of the printable medium 12 simplifies reconstruction thereof as described herein. When shredded, pages are often shredded lengthwise (y-direction) or laterally across the page (x-direction). Because of their sequential arrangement, the illustrated position codes X, Y and N are substantially preserved in either an x or y direction of shredding, even if the width of the shredded portion is about the same as that of the position codes X, Y or N. It is noted that the position codes X, Y and N may be arranged other than in the sequence NXY, for example, XNY or NYNXNY.

Also, although the as-shown position codes X, Y and N are arranged along mutually perpendicular axes x and y, it will be appreciated that any suitable arrangement, such as arranging the position codes along non-perpendicular axes, may also or alternatively be employed. Moreover, although the position codes X, Y and N are arranged in a grid format, it will be appreciated that the position codes may be arranged in a format other than a grid. For example, the position codes X, Y and N may be randomly arranged on the printable medium. Also, although the position codes X, Y and N have their upper left corners serving as their positioning references, it will be appreciated that any suitable reference medium, such as the center of the position code X, Y and N, may alternatively serve as a positioning reference. Also, although in the illustrated embodiment the upper left corner of the printable medium 12 serves as the reference position (or origin) from which the position codes X, Y and N are located, it will be appreciated that any location of the printable medium, for example the lower right corner or the center, may serve as the reference position for the position codes X, Y and N. Further, the position codes X, Y and N may be embedded on both sides or either side of the printable medium 12, and the printable medium 12 may take the form of preprinted media or non-preprinted media.

Figure 3:
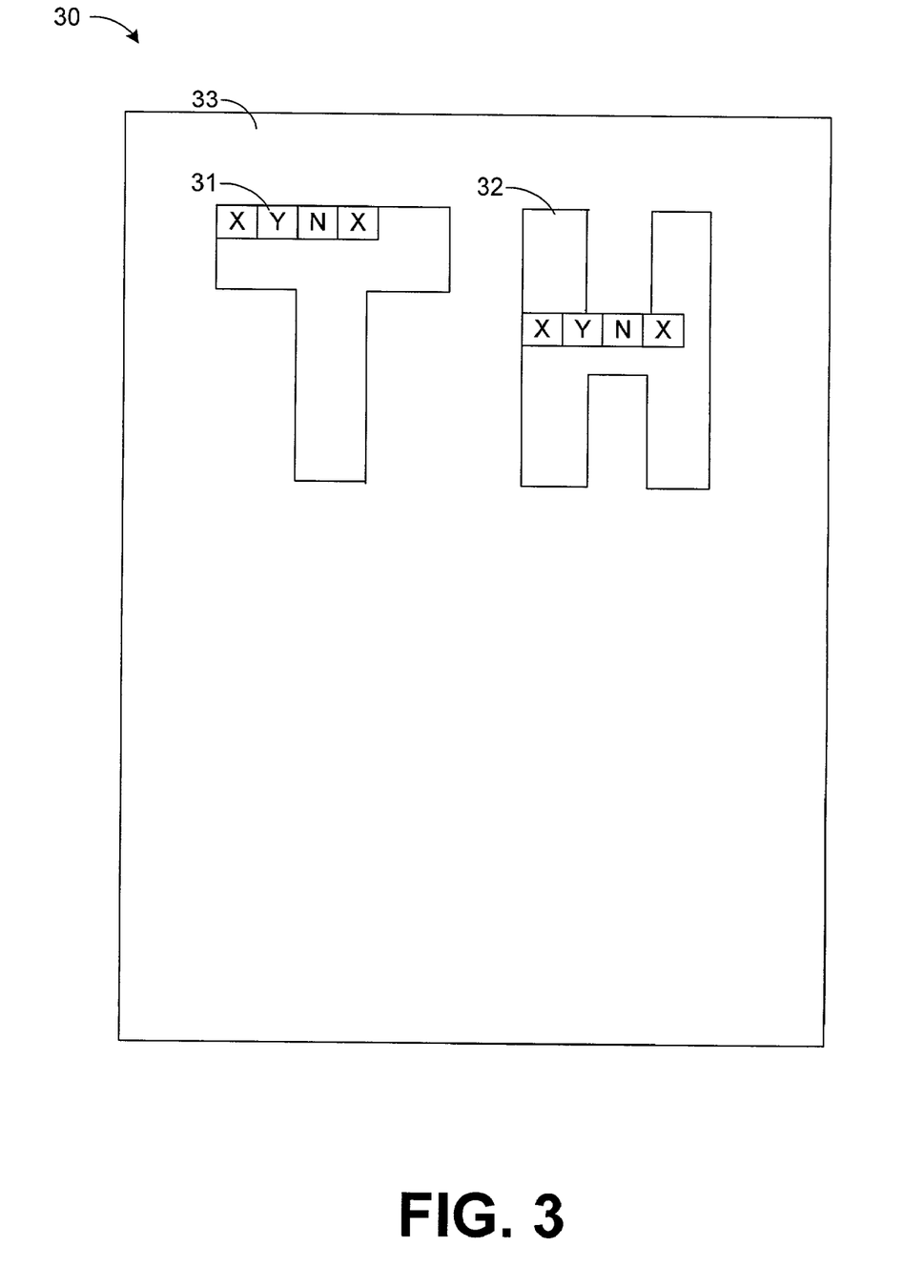
FIG. 3 illustrates an image presentation system in accordance with an embodiment of the present invention, wherein the position codes are embedded within images.

It also is noted that the position codes X, Y and N on the printable medium 12 illustrated in FIG. 1 are not visible by the naked eye, and are thus invisible. Invisible ink and/or a small resolution may be used to facilitate such invisibility. It will be appreciated that alternatively, or additionally, the position codes X, Y and N may be embedded on the printable medium 12 within images such as text, graphical images, pictures, photographs or images. For example, FIG. 3 shows a document 30 according to an embodiment of the invention, wherein position codes X, Y and N are embedded within text characters 31 and 32 on a printable medium 33. The text characters 31 and 32 are visible to the naked eye and include embedded therein the position codes X, Y and N which are not discernible to the naked eye. The position codes X, Y and N within the textual characters 31 and 32 function in the same manner as the position codes X, Y and N of FIG. 1 to indicate where the position codes X, Y and N reside relative to the printable medium 33 and consequently where that portion or surface area of the printable medium 33 on which the position codes X, Y and N reside is located relative to the remainder of the printable medium 33.

Figure 4:
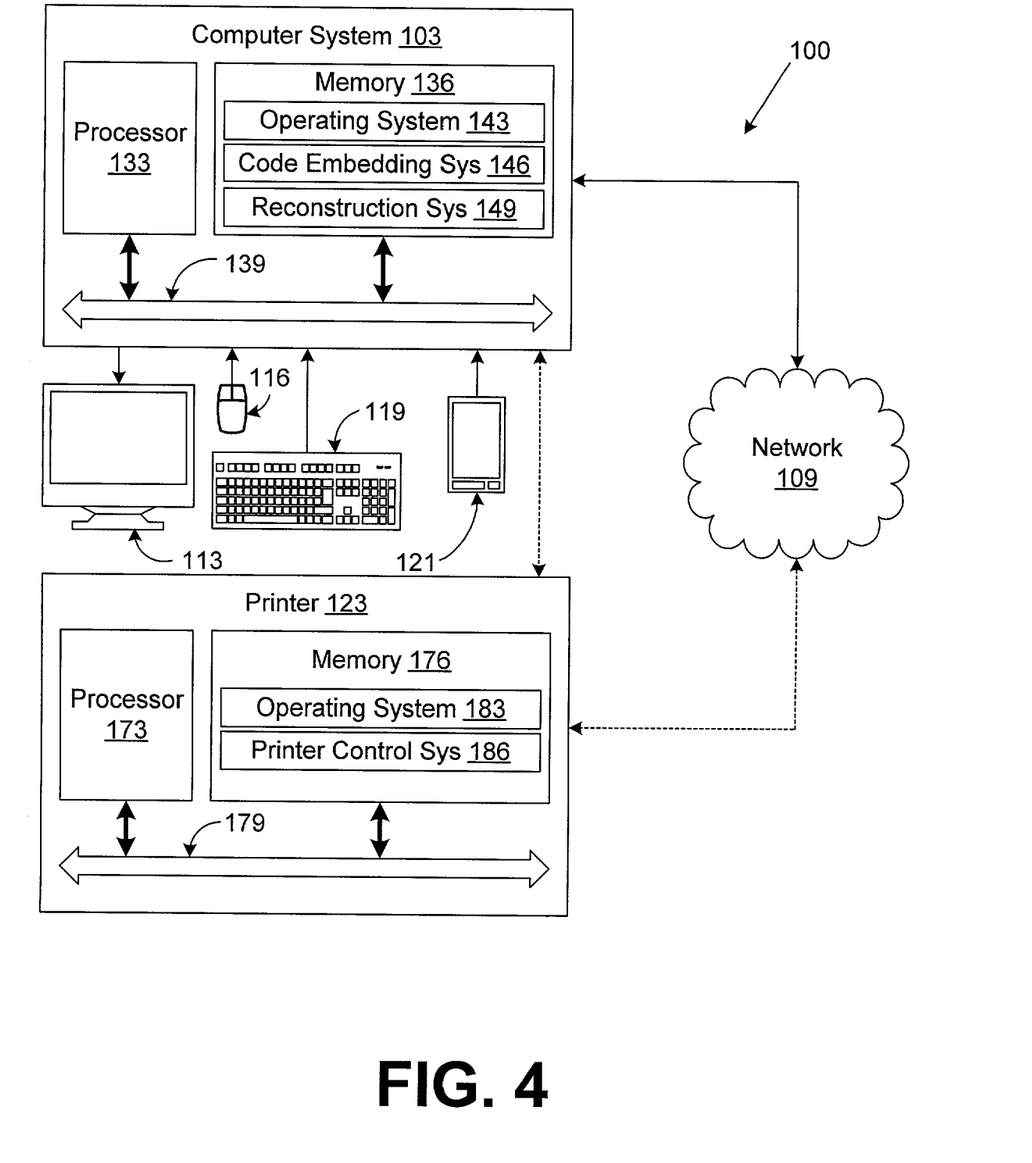
FIG. 4 illustrates a hardware system in accordance with an embodiment of the present invention for creating and/or reconstructing the system of FIG. 1.

Turning now to FIG. 4, there is shown a computer network 100 according to an aspect of the present invention. The computer network 100 provides an exemplary system for creating and/or reconstructing the above described document 10 after it was destroyed, for example, by shredding, etc. The computer network 100 includes a computer system 103 with peripheral devices which are coupled to the computer system 103 in the below described manner. In this respect, the computer system 103 may comprise, for example, a computer system such as a processor based system or a system with like capability as can be appreciated by those with ordinary skill in the art.

The computer network 100 includes, for example, a network 109. The network 109 includes, for example, the Internet, Intranets, wide area networks (WANs), local area networks (LANs), wireless networks, or other suitable networks, etc., or any combination of two or more such networks. The computer system 103 is coupled to the network 109 to facilitate data communication to and from the network 109 as is generally known by those of ordinary skill in the art. For example, the computer system 103 may be linked to the network 109 using various devices such as, for example, network cards, modems, or other communications devices.

The computer system 103 includes a display device 113, a mouse 116, a keyboard 119, a scanner 121, and a printer 123. The display device 113 may be, for example, a cathode ray tube (CRT), a liquid crystal display screen, a gas plasma-based flat panel display, or other suitable display device. The scanner 121 and printer 123 may be either local devices coupled directly to the computer system 103 or network devices coupled directly to the network 109, etc. Also, other peripheral devices may be employed with the computer system 103 such as, for example, a keypad, touch pad, touch screen, microphone, scanner, joystick, or one or more push buttons, indicator lights, speakers, as well as other devices as can be appreciated by those with ordinary skill in the art.

The computer system 103 includes a processor circuit having a processor 133 and a memory 136, both of which are coupled to a local interface 139. In this respect, the local interface 139 may be a data bus with an accompanying control/address bus as is generally understood by those with ordinary skill in the art. In this manner, the computer system 103 is a processor-based system, etc. Stored on the memory 136 and executable by the processor 133 are an operating system 143, a code embedding system 146, and a reconstruction system 149. The code embedding system 146 and reconstruction system 149 are described in greater detail below.

The printer 123 also includes a processor circuit with a processor 173 and a memory 176, both of which are coupled to a local interface 179. The local interface 179 may be, for example, a data bus with an accompanying control/address bus, etc. In this respect, the printer 123 also includes a processor-based system. Stored on the memory 176 and executable by the processor 173 are an operating system 183 and a printer control system 186. The above mentioned code embedding system 146 may also be located within the printer 123 in the event that, for example, the printer 123 is a network capable printer.

Each of the memories 136 and 176 may include both volatile and nonvolatile memory and data storage components. Volatile components are those that do not retain data values upon loss of power. Nonvolatile components are those that retain data upon a loss of power. Thus, each of the memories 136 and 176 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM)

and other such devices. The ROM may comprise, for example, a programmable read-only memory (PROM), an erasable programmable read-only memory (EPROM), an electrically erasable programmable read-only memory (EEPROM), or other like memory device.

Also, each of the processors 133 and 173 may represent multiple processors and each of the memories 136 and 176 may represent multiple memories that operate in parallel processing circuits, respectively. In such a case, each of the local interfaces 139 and 179 may be an appropriate network that facilitates communication between any two of the multiple processors, between any processor and any of the memories, or between any two of the memories, etc. The processors 133 and 173 may be electrical or optical in nature.

The operating systems 143 and 183 are executed to control the allocation and usage of hardware resources in the computer system 103 and the printer 123, respectively. Specifically, the operating systems 143 and 183 control the allocation and usage of various portions of the memories 136 and 176, processing time, and the peripheral devices as well as performing other functions. In this manner, the operating systems 143 and 183 serve as the foundation on which applications depend as is generally known by those with ordinary skill in the art.

The code embedding system 146 of the computer system 103 embeds position codes comprising machine-readable data on the printable medium to form the above mentioned document 10. The reconstruction system 149 of the computer system 103 examines portions such as, for example, shredded strips of a document 10 having position codes embedded thereon and orientates the portions according to the positions indicated by the position codes.

Figure 5:
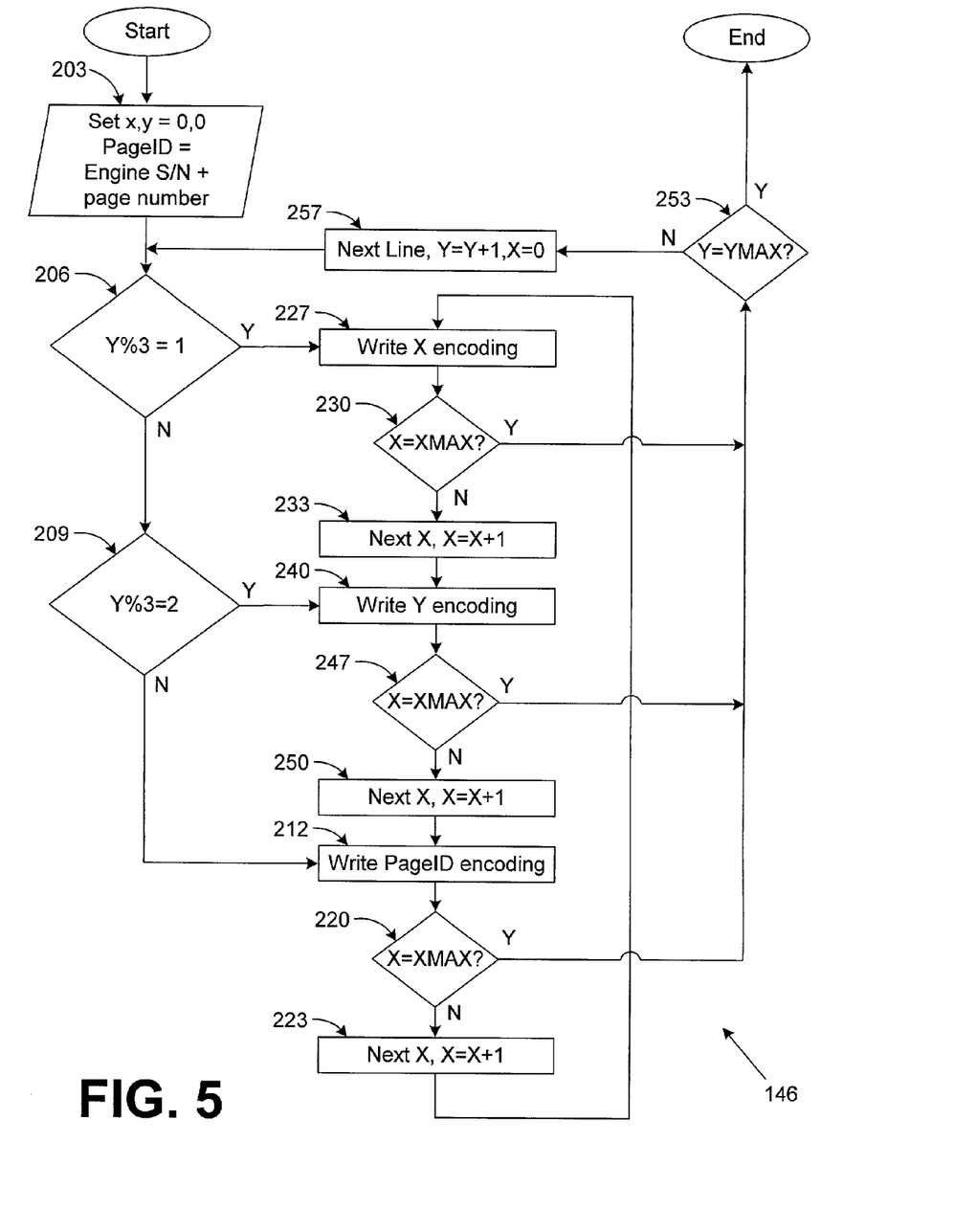
FIG. 5 is a flow chart of a code embedding system in accordance with an embodiment of the present invention, the flow chart providing a method for encoding the position codes of FIG. 1.

With reference to FIG. 5, shown is a flow chart of the code embedding system 146 according to an aspect of the present invention. Alternatively, the flow chart of FIG. 5 may be viewed as steps in a method implemented in the computer system 103 or in the printer 123 in which the code embedding system 146 is installed.

To facilitate the description which follows, the code embedding system 146 is described with respect to the above described document 10 and in terms of encoding the position codes X, Y and N on the printable medium 12. As was mentioned above, the position codes X, Y and N may be embedded on the printable medium 12 via any suitable technique. Exemplary methods include, for example, halftoning algorithms and/or pixel placement, as the precision of such techniques is highly accurate. There are available other suitable methods of embedding information as patterns or codes on a document or within text or graphics of a document. Also, embedding technologies are constantly improving, for example, the density or resolution of the embedding and the detail at which the embedded information may be scanned.

As was described above, in one embodiment the machine-readable position codes X, Y and N are orientated on the printable medium 12 as a grid or coordinate system defined by mutually perpendicular axes x and y of the printable medium 12. The x-direction is, for example, laterally across the feed direction of the printable medium 12, and parallel to lines of the printable medium 12. The y-direction is, for example, parallel to the feed direction of the printable medium 12, and represents a row or line number of the printable medium 12. It will be appreciated that the code embedding system 146 may dispose machine-readable position codes in orientations other than along mutually perpendicular axes, for example, along diagonal patterns. Also, it is noted that the code embedding system 146 embeds the position codes X, Y and N with the upper left corners thereof serving as their positioning references. It will be appreciated that any suitable reference medium, such as the center of the position code X, Y and N, may alternatively serve as a positioning reference. Also, it will be appreciated that, although the printable medium 12 is referred to herein as a page, the printable medium 12 may comprise a document of a plurality of pages.

Also, as was mentioned above, the position codes X, Y and N may be embedded as invisible position codes on the printable medium 12 or within text and/or graphics objects printed on the printable medium 12. If the position codes are to be invisible, then any suitable embedding technique may be used, for example the above mentioned invisible ink, rendering the position codes invisible to the naked eye. If the position codes are to form part or all of a text or graphics object, then any suitable embedding technique, for example pixel placement, may be used rendering the position codes indiscernible to the naked eye but the text or graphics object within which the position codes are embedded visible to the naked eye.

Beginning with block 203, the code embedding system 146 determines a start location of encoding. In the exemplary embodiment, the start location is at the top line (y=0) of the printable medium 12 and at the left most position (x=0) of the top line, although it will be appreciated that any location of the printable medium 12, such as the center or lower right corner, may serve as the start location. The printable medium 12 is assigned the position code N which, in the exemplary embodiment, is a page identifier based on a combination of the imaging engine serial number of the printer 123 and the most recent page number (that is, the total page count) produced by the imaging engine of the printer 123. For example, for an imaging engine serial number of 1234500 and a most recent page number of 98765, the position code N is 123450098765.

Next, in block 206, the code embedding system 146 determines whether the value of the present position code Y along the y-axis meets a Y % 3=1 sequence (1, 1+3, 1+3+3, . . . ). If the present position code Y does not meet the Y % 3=1 sequence then the code embedding system 146 determines, in block 209, whether the present position code Y meets a Y % 3=2 sequence (2, 2+3, 2+3+3, . . . ). If the position code Y does not meet the Y % 3=2 sequence then the code embedding system 146 instructs the printer 123, in block 212, to write the position code N on the printable medium 12 at x and y along the respective x and y axes.

The printable medium 12 is illustrative. For a position code Y having an initial value of Y=0, the position code Y meets neither the Y % 3=1 sequence (block 206), nor the Y % 3=2 sequence (block 209). Accordingly, the code embedding system 146, in block 212, instructs the printer 123 to write the position code N on the printable medium 12 in the leftmost position (x=0) of the first line (y=0) of the printable medium 12.

Next, in block 220, the code embedding system 146 determines whether an end of a line has been reached. The code embedding system does this by determining whether the position code X has attained a value equal to the rightmost position (X=XMAX) of the line along the x-axis of the printable medium 12. If the position code X is not equal to XMAX, the code embedding system 146, in block 223, increases the value of the position code X by one (1). Next, in block 227, the code embedding system 146 instructs the printer 123 to write the present value of the position code X on the printable medium 12 at the coordinate x,y=X,Y along the respective x and y axes. In block 230, the code embedding system 146 again determines whether the present position code X has attained a value equal to the rightmost position (X=XMAX) of the line along the x-axis of the printable medium 12. If the position code X is not equal to XMAX, the code embedding system 146, in block 233, again increases the value of the position code X by one (1). Next, in block 240, the code embedding system 146 instructs the printer 123 to write the present value of the position code Y on the printable medium 12 at the coordinate x,y=X,Y along the respective x and y axes. In block 247, the code embedding system 146 again determines whether the present position code X has attained a value equal to the rightmost position (X=XMAX) of the line along the x-axis of the printable medium 12. If the position code X is not equal to XMAX, the code embedding system 146, in block 250, again increases the value of the position code X by one (1). Next, the code embedding system 146 repeats block 212 and instructs the printer 123 to again write the position code N on the printable medium 12 at the present X and Y positions along the respective x and y axes of the printable medium 12.

By way of example, reference is again made to the printable medium 12. Assuming XMAX=275, in block 220, the present value of the position code X is 0, and thus is less than XMAX=275. Accordingly, in block 223, the position code X is increased by one (1) so that X=1 and, in block 227, the new position code X (X=1) is written on the printable medium 12 at the coordinate x,y=1,0 along the respective x and y axes; that is, to the right of the previously written position code N located at x,y=0,0. In block 230, the position code X is 1, and thus is still less than XMAX=275. Accordingly, in block 233, the position code X is increased by one (1) so that X=2 and, in block 240, the present position code Y (Y=0) is written on the printable medium 12 at the coordinate x,y=2,0 along the respective x and y axes. In other words, the present position code Y is written to the right of the position code X=1 located at x,y=1,0. In block 247, the position code X is 2, and thus is still less than XMAX=275. Accordingly, in block 250, the position code X is again increased by one (1) so that X=3 and, in block 212, the position code N is again written on the printable medium 12 at the coordinate x,y=3,0 along the respective x and y axes. In other words, the position code N is written to the right of the position code Y located at x,y=2,0.

The pattern NXY is repeated via the loop formed by blocks 212, 227 and 240 until the code embedding system 146 determines, in block 220, that the end of the line has been reached, which occurs when the position code X has attained a value equal to the rightmost position of the line along the x-axis of the printable medium 12, or X=XMAX. For the exemplary printable medium 12, the pattern NXY is repeated until X=XMAX=275. The code embedding system 146 then turns to block 253.

In block 253, the code embedding system 146 determines whether an end of a page 12 has been reached. The code embedding system 146 does this by determining whether the position code Y has attained a value equal to the bottommost position (Y=YMAX) of the page 12 along the y-axis of the page 12. If the position code Y is not equal to YMAX, the code embedding system 146, in block 257, increases the value of the position code Y by one (1) and resets the position code X=0.

The code embedding system 146 then determines, in block 206, whether the value of the new position code Y meets the Y % 3=1 sequence (1, 4, 7, . . . ) or, in block 209, whether the value of the new position code Y meets the Y % 3=2 sequence (2, 5, 8, . . . ). If the position code Y meets the Y % 3=1 sequence, then the code embedding system 146 proceeds to block 227. In block 227, the position code X (X=0) is written on the printable medium 12 at the coordinate x,y=0,1 along the respective x and y axes. The code embedding system 146 then again goes through the repeating loop of blocks 240 (writing Y), 212 (writing N) and 227 (writing X) until the end of the line is again reached (i.e., X=XMAX). Further, if the position code meets the Y % 3=2 sequence, then the code embedding system 146 proceeds to block 240. In block 240, the position code Y (for example, Y=2) is written on the printable medium 12 at the coordinate x,y=0,2 along the respective x and y axes. The code embedding system 146 then again goes through the repeating loop of blocks 212 (writing N), 227 (writing X) and 240 (writing Y) until the end of the line is again reached (i.e., X=XMAX).

From the foregoing, it should be apparent that in lines 0, 3, 6, . . . (Y=0, 3, 6 . . . ,), the code embedding system 146 repeats the pattern NXY; in lines 1, 4, 7, . . . (Y=1, 4, 7, . . . ), the code embedding system 146 repeats the pattern XYN; and, in lines 2, 5, 8, . . . (Y=2, 5, 8, . . . ), the code embedding system 146 repeats the pattern YNX. As was described above, in each case the pattern is repeated until the code embedding system 146 determines, in block 220, that the end of a line has been reached.

The code embedding system 146 continues to write the pattern NXY on each line until in box 253 the end of the page 12 is reached, which occurs when the position code Y has attained a value equal to the bottommost position of the page 12 along the y-axis of the page 12, or Y=YMAX. When the YMAX value is reached, the code embedding system 146 ends the encoding process.

Although the flow chart of FIG. 5 provides for the embedding of position codes on a printable medium comprising a single page, the flow chart can be easily adapted to provide for embedding codes on a printable medium made up of multiple pages.

Figure 6:
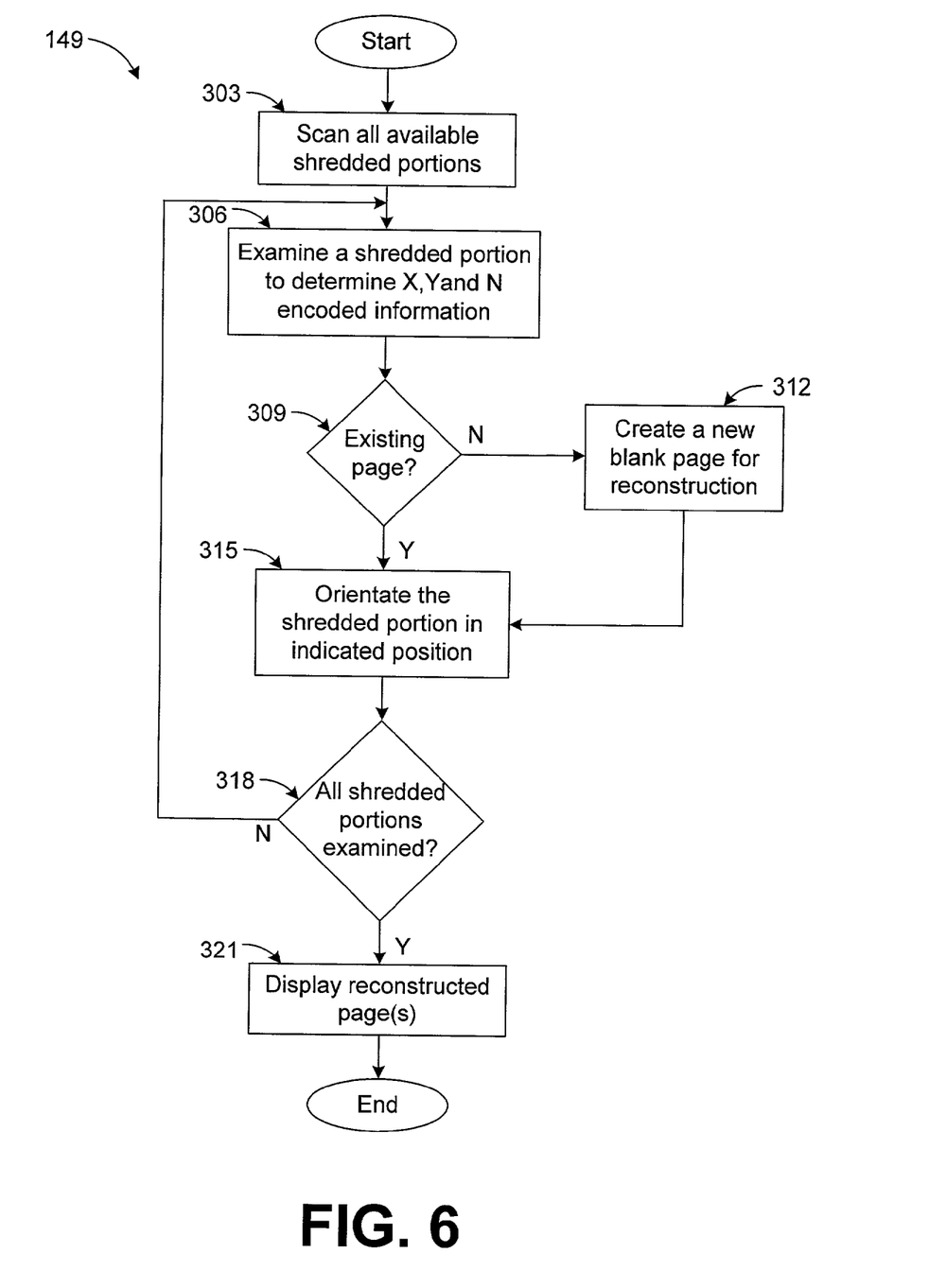
FIG. 6 is a flow chart of a reconstruction system in accordance with an embodiment of the present invention, the flow chart providing a method of reconstructing shredded portions of the system of FIG. 1.

Referring now to FIG. 6, there is shown a flow chart of the reconstruction system 149 according to an aspect of the present invention. Alternatively, the flow chart of FIG. 6 may be viewed as steps in a method implemented in the computer system 103 or in the printer 123 in which the reconstruction system 149 is installed.

As with the code embedding system 146, to facilitate the description which follows, the reconstruction system 149 is described with respect to the above described printable medium 12. To this end, the reconstruction system 149 is described in terms of reconstructing a printable medium 12 and/or images thereon that have been shredded into multiple shredded portions, the shredded portions having position codes X, Y and N.

Beginning with block 303, initially the scanner 121 scans all available shredded portions of the printable medium 12 and creates a digital data record of the scanned portions. Any suitable scanner and/or scanning method, for example optical character recognition software and/or techniques, may be employed to read the shredded portions. The digital record may be stored in one or more of the memories 136 and 176 of the respective computer system 103 and printer 123.

In block 306, the reconstruction system 149 examines a shredded portion, for example by analyzing the digital record thereof, to identify the position codes X, Y and N embedded on the shredded portion. As noted above, the unique position code N identifies the specific page or print medium 12 of the document 10 from which the shredded portion came, and the position codes X and Y identify the appropriate positions of the position codes X and Y on the print medium 12 relative to itself. In block 309, the reconstruction system 149 determines whether the shredded portion constitutes part of an existing page or print medium 12 associated with the document 10. An existing page or print medium 12 is one for which a page identifier N has already been identified by the reconstruction system 149 and for which a new blank page has already been created. If the reconstruction system 149 determines that the shredded portion is part of an existing page, then the reconstruction system 149 proceeds to block 315. If the reconstruction system 149 determines that the shredded portion is not part of an existing page then, in block 312, the reconstruction system 149 creates a new blank page before proceeding to block 315.

In block 315, the reconstruction system 149 orientates the shredded portion on the x and y axes of the print medium 12 presently under construction (page N) according to the position indicated by the respective position codes X and Y. Specifically, the shredded portion is orientated so that the position codes X and Y fall on their corresponding positions on the print medium 12 presently under construction (page N). Of course, the greater the density or resolution of position codes X and Y, the greater will be the accuracy of positioning the shredded portion relative to other shredded portions and relative to the print medium 12. Once the shredded portion has been positioned, the reconstruction system 149 determines, in block 318, whether all of the shredded portions have been examined and orientated in their respective positions. If the reconstruction system 149 determines that there remains some shredded portions to be examined and positioned, then the reconstruction system 149 returns to block 306 to examine the next shredded portion in the digital record.

If the reconstruction system 149 determines that there are no remaining shredded portions to be examined, then in block 321 the reconstruction system 149 displays the reconstructed print mediums 12 of the document 10.

Although the code embedding system 146 and reconstruction system 149 (FIGS. 4–6) of the present invention are each embodied in software or code executed by general purpose hardware as discussed above, as an alternative the systems 146 and 149 may also be embodied in dedicated hardware or a combination of software/general purpose hardware and dedicated hardware. If embodied in dedicated hardware, the systems 146 and 149 can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The flow charts of FIGS. 5 and 6 show the architecture, functionality, and operation of an implementation of the respective code embedding system 146 and reconstruction system 149. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flow charts of FIGS. 5 and 6 show a specific order of execution, it is understood that the order of execution may differ from that which is depicted. For example, the order of execution of two or more blocks may be scrambled relative to the order shown. Also, two or more blocks shown in succession in FIGS. 5 or 6 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present invention.

Also, where either code embedding system 146 or reconstruction system 149 comprises software or code, it can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present invention, a "computer-readable medium" can be any medium that can contain, store, or maintain the code embedding system 146 and/or reconstruction system 149 for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Although the invention is shown and described with respect to certain embodiments, it is obvious that equivalents and modifications will occur to others skilled in the art upon the reading and understanding of the specification. The present invention includes all such equivalents and modifications, and is limited only by the scope of the claims.

The invention claimed is:

1. A method of reconstructing portions of a shredded document, the shredded document including individual shredded portions of a printable medium and one or more position codes embedded thereon, each position code being indicative of a position of the position code on the printable medium relative to the printable medium, the method comprising:

scanning the individual shredded portions of the shredded document, the position codes being embedded within at least one image on the printable medium of the shredded document, the at least one image being visible to the naked eye;

examining the individual shredded portions of the shredded document to identify thereon at least one of the position codes of the printable medium of the shredded document; and orientating the individual shredded portions according to the position indicated by the at least one of the position codes.

2. A method as set forth in claim 1, wherein the step of scanning includes creating a digital data record of the scanned information, and the step of examining includes analyzing the digital record.

3. A method as set forth in claim 1, wherein the step of examining includes examining each individual shredded portion to identify position codes X,Y which identify, respectively, x and y positions of the positions codes X,Y on the printable medium relative to the printable medium.

4. A method as set forth in claim 1, wherein the printable medium includes plural pages, and wherein the step of examining includes examining each individual shredded portion to identify a position code N which identifies a page identifier of the printable medium.

5. A method as set forth in claim 1, further including, after the step of examining the individual shredded portions, identifying whether the individual shredded portion constitutes part of an existing page or a new page of the printable medium.

6. A system for reconstructing portions of an a shredded document, the shredded document including individual shredded portions of a printable medium and one or more position codes embedded thereon, each position code being indicative of a position of the position code on the printable medium relative to the printable medium, the system comprising:

means for scanning individual shredded portions of the shredded document, the position codes being embedded within at least one image on the printable medium of the shredded document, the at least one image being visible to the naked eye;

means for examining the individual shredded portions of the shredded document to identify thereon at least one of the position codes of the printable medium of the shredded document; and means for orientating the individual shredded portions according to the position indicated by the at least one of the position codes.

7. A system as set forth in claim 6, wherein the means for scanning includes means for creating a digital data record of the scanned information, and the means for examining includes means for analyzing the digital record.

8. A system as set forth in claim 6, wherein the means for examining includes means for examining each individual shredded portion to identify position codes X,Y which identify, respectively, x and y positions of the positions codes X,Y on the printable medium relative to the printable medium.

9. A system as set forth in claim 6, wherein the printable medium includes plural pages, and wherein the means for examining includes means for examining each individual shredded portion to identify a position code N which identifies a page identifier of the printable medium.

10. A system as set forth in claim 6, further including means for identifying whether the individual shredded portion constitutes part of an existing page or a new page of the printable medium.

11. A program stored on a computer readable medium for reconstructing portions of an a shredded document, the shredded document including individual shredded portions of a printable medium and one or more position codes embedded thereon, each position code being indicative of a position of the position code on the printable medium relative to the printable medium, the program comprising:

code that scans individual shredded portions of the shredded document, the position codes being embedded within at least one image on the printable medium of the shredded document, the at least one image being visible to the naked eye;

code that examines the individual shredded portions of the shredded document to identify thereon at least one of the position codes of the printable medium of the shredded document; and code that orientates the individual shredded portions according to the position indicated by the at least one of the position codes.

12. A program as set forth in claim 11, wherein code that scans individual shredded portions of the shredded document includes code that creates a digital data record of the scanned information, and the code that examines the individual shredded portions of the shredded document includes code that analyzes the digital record.

13. A program as set forth in claim 11, wherein the code that examines the individual shredded portions of the shredded document includes code that examines each individual shredded portion to identify position codes X,Y which identify, respectively, x and y positions of the positions codes X,Y on the printable medium relative to the printable medium.

14. A program as set forth in claim 11, wherein the printable medium includes plural pages, and wherein the code that examines the individual shredded portions of the shredded document includes code that examines each individual shredded portion to identify a position code N which identifies a page identifier of the printable medium.

15. A program as set forth in claim 11, further including code that identifies whether the individual shredded portion constitutes part of an existing page or a new page of the printable medium.

\* \* \* \* \*